(12) United States Patent
Chamoto et al.

(10) Patent No.: US 6,851,256 B2
(45) Date of Patent: Feb. 8, 2005

(54) EXHAUST EMISSION CONTROL DEVICE

(75) Inventors: Tetsuo Chamoto, Kyoto (JP); Mikio Terada, Shiga (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/385,684

(22) Filed: Mar. 12, 2003

(65) Prior Publication Data

US 2003/0209009 A1 Nov. 13, 2003

(30) Foreign Application Priority Data

Mar. 12, 2002 (JP) ..................................... P2002-066590

(51) Int. Cl.$^7$ ................................................. F01N 5/04
(52) U.S. Cl. .............................. 60/280; 60/295; 60/297; 60/311; 60/602; 123/559.1; 123/561
(58) Field of Search .......................... 60/280, 285, 295, 60/297, 311, 602; 123/559.1, 559.2, 561

(56) References Cited

U.S. PATENT DOCUMENTS

| | | | | |
|---|---|---|---|---|
| 4,615,172 A | * | 10/1986 | Mayer | ........................ 60/274 |
| 6,422,004 B1 | * | 7/2002 | Takami et al. | ................. 60/285 |
| 6,546,721 B2 | * | 4/2003 | Hirota et al. | .................. 60/297 |
| 6,666,020 B2 | * | 12/2003 | Tonetti et al. | ................. 60/286 |
| 6,672,050 B2 | * | 1/2004 | Murata et al. | ................. 60/284 |

FOREIGN PATENT DOCUMENTS

JP          2000-87736 A        3/2000

* cited by examiner

*Primary Examiner*—Binh Q. Tran
(74) *Attorney, Agent, or Firm*—Birch, Stewart, Kolasch & Birch, LLP

(57) ABSTRACT

An exhaust emission control device has operating condition detecting means for detecting an operating condition of an engine, fuel control means for controlling fuel supply into a combustion chamber of the engine on the basis of an output of the operating condition detecting means, a turbo charger for supercharging a suction air with an exhaust gas of the engine, wherein a filter for capturing particulates in the exhaust gas is disposed in an exhaust gas passage on the downstream side of a turbine of the turbo charger, and the filter holds alkaline metal catalyst. Exhaust gas temperature sensing means senses (or estimates) the exhaust gas temperature near the filter, and supercharging pressure control means controls a supercharging pressure of the turbo charger to be increased when the exhaust gas temperature exceeds a predetermined temperature.

7 Claims, 5 Drawing Sheets

MAXIMUM θ (HIGH LOAD STATE)

MINIMUM θ (LOW LOAD STATE)

EXHAUST EMISSION CONTROL DEVICE

BACKGROUND OF THE INVENTION

1. Field of the Invention

The present invention relates to an exhaust emission control device suitably used for a diesel engine.

2. Description of the Related Art

An exhaust gas from the diesel engine contains the particulate (hereinafter referred to as soot) mainly composed of carbon. Various techniques for suppressing the soot to be exhausted into the atmosphere have been put into practical use.

As one of the techniques, a continuous regeneration exhaust emission control device is well known in which an oxidation catalyst and a particulate capturing filter (abbreviated as DPF) are disposed in the order from the upstream side. Another device is also well known in which alkaline metal catalyst is held in the DPF to improve the regeneration performance of the DPF.

However, the alkaline metal catalyst causes depression in a high temperature area owing to reconnection of alkaline metal and splashing by evaporation, whereby it is necessary to suppress an excessive rise in exhaust gas temperature while driving fast or driving at high load.

By the way, an engine with a capacity fixed turbo charger can suppress an exhaust gas temperature during the high rotation and high load driving by setting an injection valve opening pressure of a waste gate valve at a higher value to raise a supercharging pressure and increase an intake air flow.

However, when the injection valve opening pressure of the waste gate valve is raised, the supercharging pressure in a low rotation area of the engine also rises. Therefore, if an internal pressure of cylinder of the engine is suppressed within a permissible limit, it is required that the injection timing of fuel is retarded, resulting in a problem that the fuel consumption is worse. Also, a pumping loss in the low rotation area is increased, leading to a risk that the fuel consumption is also worse.

SUMMARY OF THE INVENTION

The present invention has been achieved in the light of the above-mentioned problems, and it is an object of the invention to provide an exhaust emission control device useful for an engine with a turbo charger that is capable of suppressing an excessive rise in the exhaust gas temperature without making the fuel consumption worse and effectively preventing depression of the DPF holding alkaline metal catalyst.

In order to achieve the above object, the present invention provides an exhaust emission control device comprising operating condition detecting means for detecting an operating condition of an engine, fuel control means for controlling fuel supply into a combustion chamber of the engine on the basis of an output of the operating condition detecting means, a turbo charger for supercharging a suction air in accordance with an exhaust gas of the engine, wherein a filter for capturing particulates in the exhaust gas is disposed in an exhaust gas passage on the downstream side of a turbine of the turbo charger. Since the filter holds alkaline metal catalyst, the regenerating performance of the filter can be improved.

And exhaust gas temperature sensing means senses the exhaust gas temperature near the filter, and supercharging pressure control means controls a supercharging pressure of the turbo charger to be increased when the exhaust gas temperature sensed by the exhaust gas temperature sensing means exceeds a predetermined temperature.

Thereby, when the exhaust gas temperature is high, the supercharging pressure of the turbo charger is increased, so that a suction air having relatively low temperatures flows into the combustion chamber to decrease the exhaust gas temperature, and thus prevent depression of the filter.

According to the invention, only when the exhaust gas temperature is high, the supercharging pressure of the turbo charger is changed to decrease the exhaust gas temperature, whereby the exhaust gas temperature is effectively prevented from rising without making the fuel consumption worse in the low rotation and low load running condition when the injection valve opening pressure of the waste gate valve for the capacity fixed turbo charger is set at a higher value as conventionally performed. And if the exhaust gas temperature is decreased, the filter with alkaline metal catalyst carried is prevented from causing depression due to thermal deterioration.

Also, the turbo charger may be constituted of a variable capacity turbo, in which the supercharging pressure control means controls the variable capacity turbo to increase the supercharging pressure when the exhaust gas temperature sensed by the exhaust gas temperature sensing means exceeds the predetermined temperature.

In this manner, when the supercharging pressure is increased or decreased by controlling the capacity of turbo charger, the exhaust gas temperature is effectively controlled without making the fuel consumption worse.

Also the turbo charger has a control valve for regulating the amount of exhaust gas to bypass the turbine, in which the supercharging pressure control means controls the control valve to be closed to decrease the amount of exhaust gas to be bypassed when the exhaust gas temperature sensed by the exhaust gas temperature sensing means exceeds the predetermined temperature.

Also, the amount of exhaust gas to bypass the turbine is regulated by opening or closing the control valve provided in the bypass passage, whereby the exhaust gas temperature is controlled by adjusting the supercharging pressure of the turbo charger. The turbo charger may be of the fixed capacity type, resulting in the simplified constitution of the device.

The fuel control means has injection timing control means for controlling the fuel injection timing of the fuel to be supplied into the combustion chamber of the engine, in which the injection timing control means controls the fuel injection timing to be retarded, when the supercharging pressure of the turbo charger is increased.

When the supercharging pressure is increased, the injection timing control means control the injection timing of the fuel into the combustion chamber to be retarded to decrease the engine output, whereby the increased output is offset by the increased supercharging pressure, thereby suppressing the output differences caused under the exhaust gas temperature control. By retarding the injection timing, the pressure within the combustion chamber at the time of combustion is decreased, so that the increased pressure within the combustion chamber at the time of combustion due to increased supercharging pressure is offset, preventing the failure of the engine.

Moreover, the supercharging pressure control means may control the supercharging pressure of the turbo charger to be increased when the exhaust gas temperature exceeds the predetermined temperature and the engine is operated beyond a predetermined load. Also, the operating condition sensing means may have load change rate detecting means for detecting the rate of change for the load of the engine, in which the supercharging pressure control means controls the supercharging pressure of the turbo charger to be increased when the exhaust gas temperature exceeds the predetermined temperature and the rate of change for the engine load is a positive value.

In this manner, only when the exhaust gas temperature is high, the supercharging pressure of the turbo charger is changed to decrease the exhaust gas temperature, whereby it is possible to effectively prevent a rise in the exhaust gas temperature without making the fuel consumption worse in the low rotation and low load running. And by decreasing the exhaust gas temperature, the filter with alkaline metal catalyst carried is prevented from causing depression due to thermal deterioration.

Also, the exhaust gas passage has preferably oxidation catalyst disposed on the upstream side of the filter and on the downstream side of the turbine. Thereby, the particulate is burnt and removed at the exhaust gas temperature due to catalytic action of oxidation catalyst, allowing for the continuous regeneration of the filter.

DETAILED DESCRIPTION OF THE PREFFERED EMBODIMENTS

Figure 1:
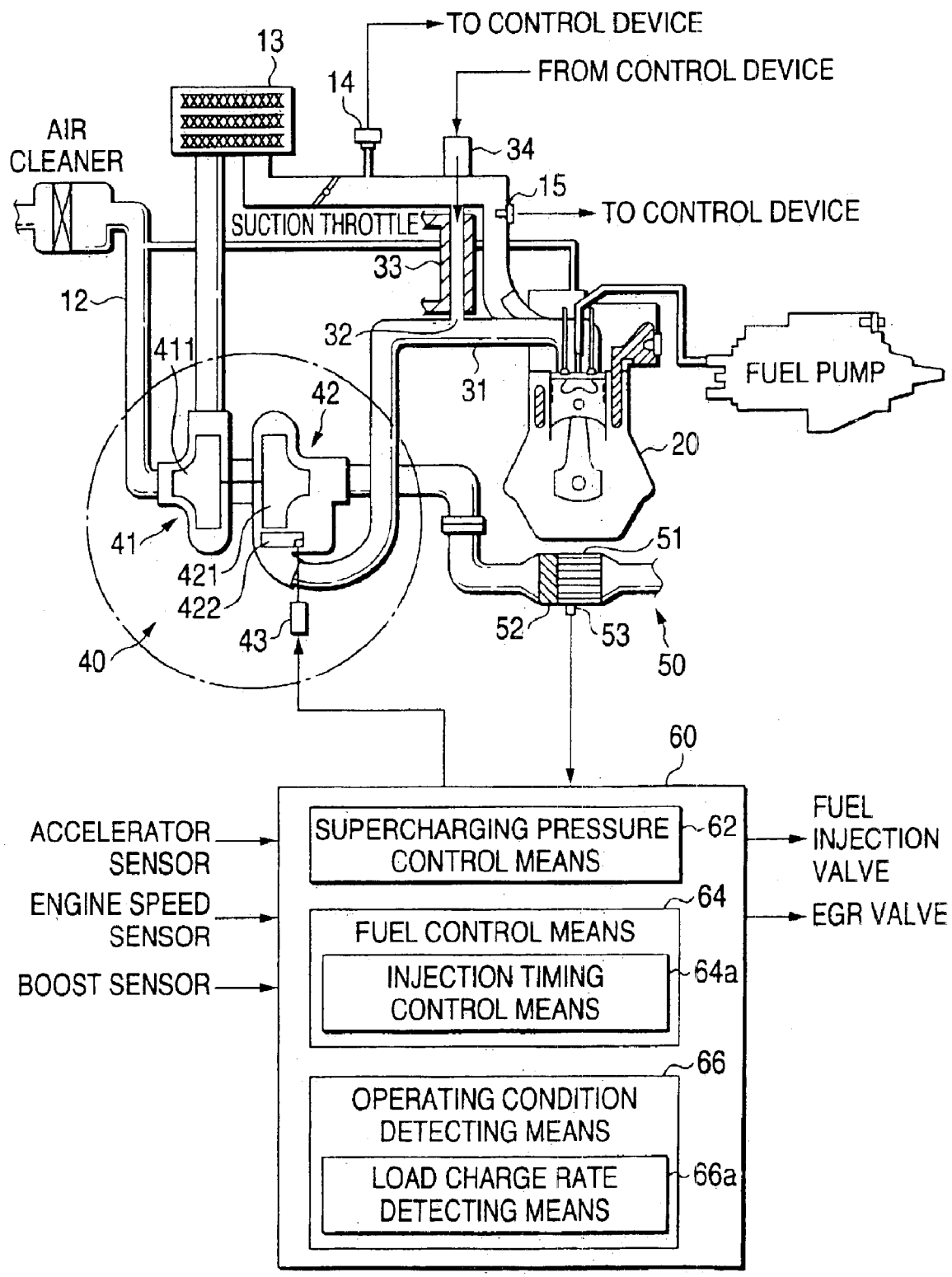
FIG. 1 is a schematic view showing the overall constitution of a diesel engine having an exhaust emission control device according to one embodiment of the present invention.
Figure 2:
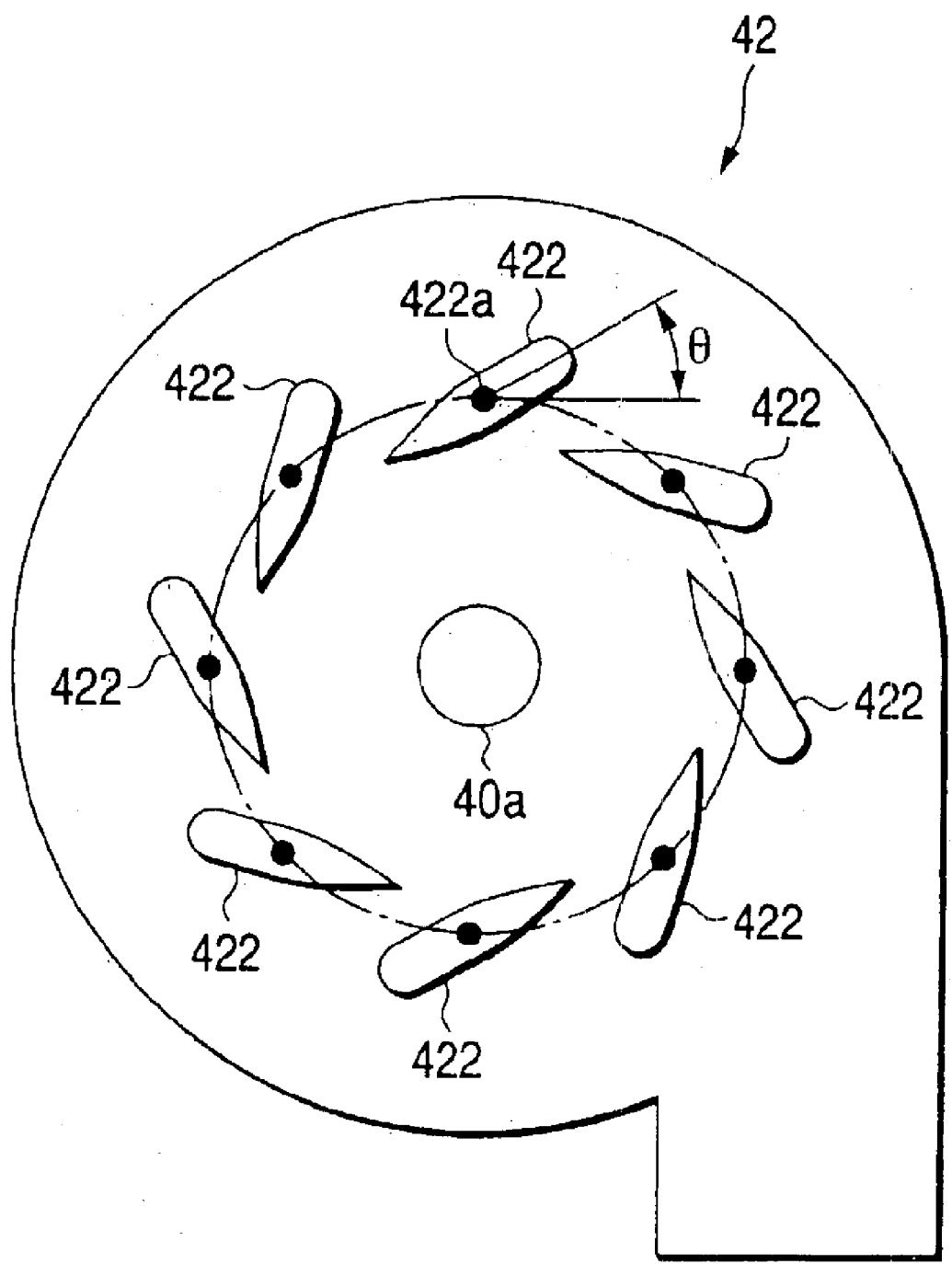
FIG. 2 is an enlarged view partially showing the exhaust emission control device.
Figure 3A:
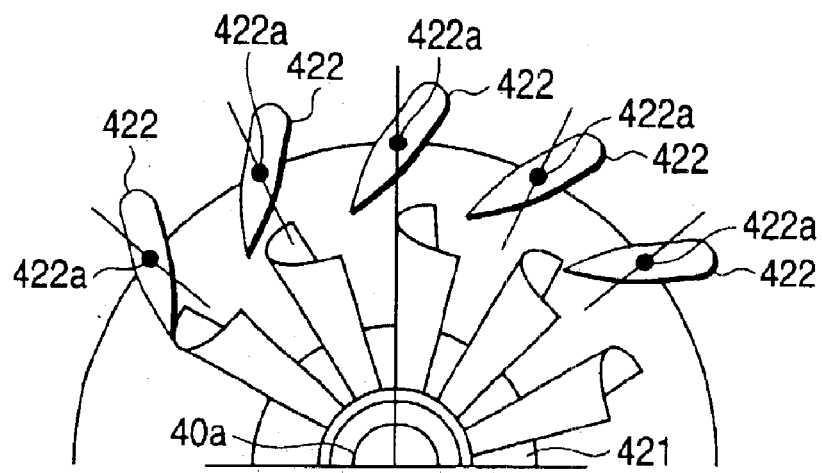
FIG. 3 is an explanatory view for explaining the action of the exhaust emission control device.

The preferred embodiments of an exhaust emission control device according to one embodiment of the present invention will be described below with reference to the accompanying drawings. FIG. 1 is a schematic view showing the overall constitution of a diesel engine equipped with this exhaust emission control device, FIGS. 2 and 3 are schematic views partially showing the exhaust emission control device, and FIG. 4 is a flowchart for explaining the action of the exhaust emission control device.

The diesel engine according to this embodiment comprises a turbo charger 40 having a compressor 41 and a turbine 42 that are integrally rotated by the same shaft 40a. The compressor 41 is interposed in a suction passage 12 on the inlet side of an engine main body 20 and the turbine 42 is interposed in an exhaust passage 31 on the outlet side of the engine main body 20. A soot removal device 50 for removing the soot is disposed in the exhaust gas in the exhaust passage 31 on the downstream side of the turbine 42, as shown in FIG. 1.

Also, an intercooler 13 is disposed in the suction passage 12 on the downstream side of the compressor 41 to cool a suction air to increase the compression efficiency. A boost sensor 14 is provided in the suction passage 12 on the downstream side of the intercooler 13 to sense a suction pressure and send it to a control device 60.

An EGR passage 32 is connected to the exhaust gas passage 31 for communicating the upstream side of the turbine 42 and the downstream side of the intercooler 13 of the suction passage 12, whereby a part of the exhaust gas is cooled by an EGR cooler 33 and circulated to the suction side by opening an EGR valve 34 provided in the EGR passage 32.

The soot removal device 50 comprises within its case, from the upstream side, an oxidation catalyst 52, and a porous filter (DPF) 51 for capturing and depositing the soot in the exhaust gas. The oxidation catalyst 52 holds a catalyst metal having oxidation function such as Pt (platinum), and allows for the continuous regeneration of the DPF 51 by changing (or oxidizing) NO in the exhaust gas into $NO_2$, and combusting the soot captured by the DPF 51 due to $NO_2$ having a high function as oxidant at relatively low temperatures (below a self ignition temperature of soot). Also, the DPF 51 holds catalytic components of alkaline metal such as K (potassium) to enhance the continuous regeneration performance of the DPF 51.

Accordingly, the soot in the exhaust gas captured by the DPF 51 is burnt and removed under the influence of heat generated due to oxidation reaction of the oxidation catalyst 52, $NO_2$ supplied from the oxidation catalyst 52, and catalytic components of alkaline metal held by the DPF 51, without using any heater separately, whereby the DPF 51 can be continuously regenerated.

Also, the soot removal device 50 is provided with an exhaust gas temperature sensor 53 between the oxidation catalyst 52 and the DPF 51 to sense the exhaust gas temperature near the filter 51 or oxidation catalyst 52 (exhaust gas temperature sensing means 55).

The turbo charger 40 has a turbine wheel 421 of the turbine 42 provided in the exhaust gas passage 31 and a compressor wheel 411 of the compressor 41 provided in the suction gas passage 12 that are linked by a shaft 40a and rotated integrally. The turbine wheel 421 is rotated due to an exhaust pressure of the exhaust gas, so that the compressor wheel 411 is rotated to feed the suction air to the side of the engine main body 20.

The turbine 42 has a turbine structure typical (well-known) as variable geometry turbo charger. As shown in FIG. 2, a plurality of vanes 422 are rotatably mounted by a mounting portion 422a around the turbine wheel 421 attached to the shaft 40a, each mounting portion 422a being disposed on a circle around the shaft 40a, as shown in FIG. 2. And each vane 422 is rotated by an actuator 43 shown in FIG. 1, whereby the amount of rotation (amount of opening) θ for the vane 422 is controlled arbitrarily (or at multiple stages) by the control device 60 to change the turbine capacity.

The control device 60 comprises supercharging pressure control means 62 for controlling the activation of the actuator 43 and fuel control means 64 for controlling the fuel injection amount and the fuel injection timing of the fuel injection valve 22. They are connected to an exhaust gas temperature sensor 53, a boost sensor 14, a suction temperature sensor 15, an engine speed sensor (not shown), and an accelerator sensor (not shown), whereby the vane opening is regulated by the supercharging pressure control means 62 on the basis of the information of each sensor, and the fuel injection amount and the fuel injection timing are adjusted by the fuel control means 64. Also, the fuel control means 64 has injection timing control means 64a for controlling the injection timing of fuel.

Herein, the boost sensor 14, the suction gas temperature sensor 15, the engine speed sensor and the accelerator sensor make up operating condition detecting means 66.

Figure 3B:
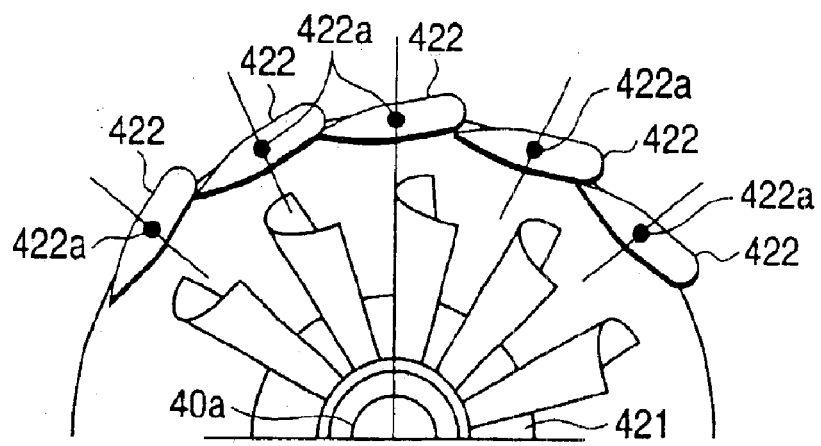
Figure 4:
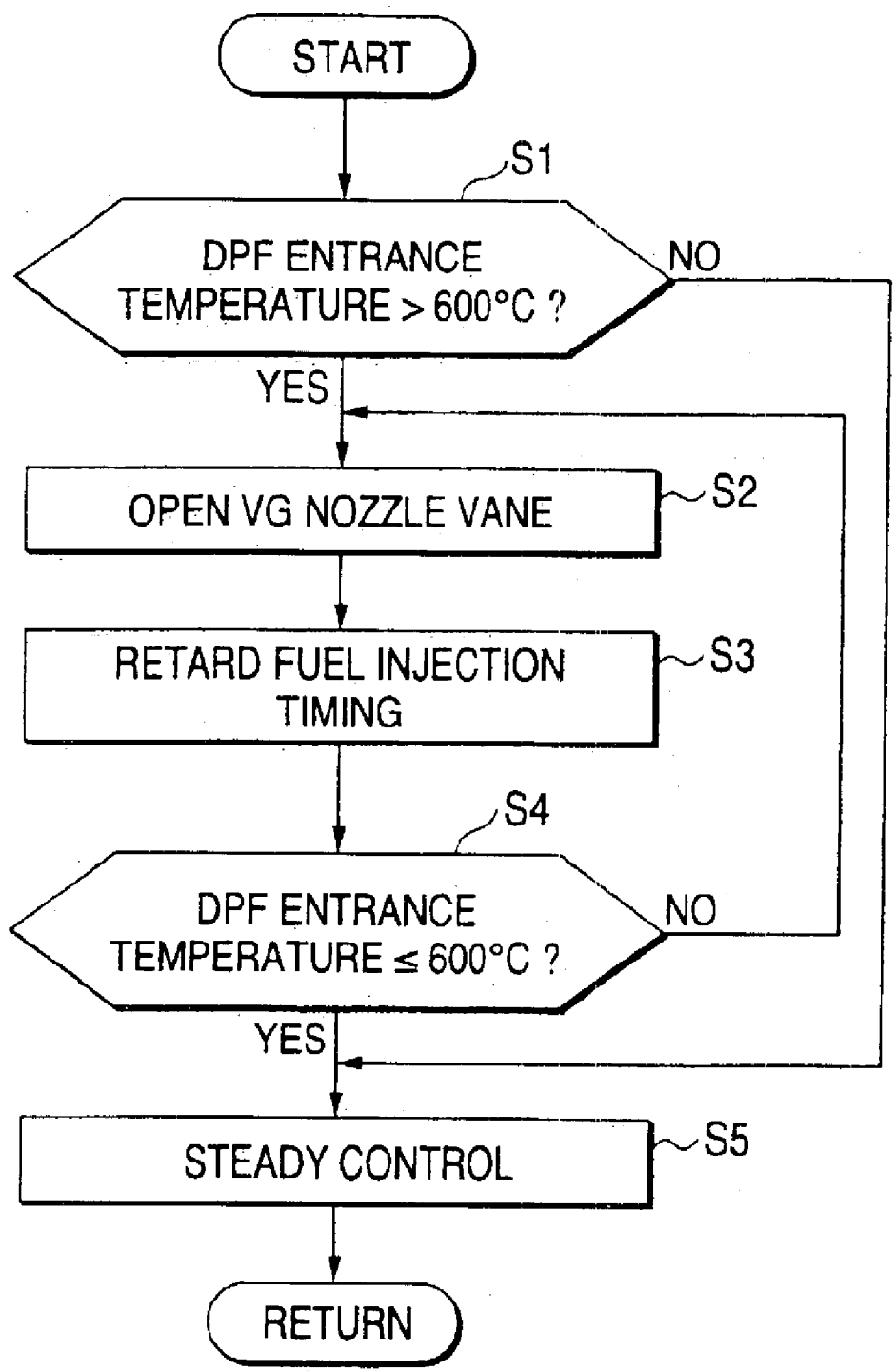
FIG. 4 is a flowchart for explaining the action of the exhaust emission control.

Namely, the supercharging pressure control means 62 reduces the amount of opening θ of the vane 422 as shown in FIG. 3B to decrease the supercharging pressure of the compressor 41 and suppress an increasing amount of suction air, in a low engine speed area or a low load state, thereby preventing the temperature within the combustion chamber from decreasing excessively. Also, the fuel control means 64 controls the fuel injection valve 22 on the basis of a control map in which the fuel injection amount for realizing the fuel consumption performance optimal for the predetermined engine load and engine speed is mapped (steady control).

More specifically, using the control map, the desired fuel injection amount is calculated from the engine speed and engine load detected by the engine speed sensor and the accelerator sensor respectively, and the fuel injection valve 22 is controlled so that the fuel injection amount becomes the desired value.

Conversely, when the exhaust gas temperature rises excessively in a high engine speed area and a high load state (e.g., above 600° C.), the supercharging pressure control means 62 makes the control (exhaust temperature control) for decreasing the exhaust gas temperature to prevent catalytic components of alkaline metal held on the DPF 51 from being deteriorated.

More specifically, the supercharging pressure control means 62 makes the amount of opening θ of the vane 422 larger as shown in FIG. 3A to increase the supercharging pressure of the compressor 41, and decrease the exhaust gas temperature due to a large amount of air having low temperatures introduced into the combustion chamber. At the same time, the injection timing of fuel supplied from the fuel injection valve 22 is retarded to reduce an increased pressure within the combustion chamber at the time of combustion, caused by an increased suction pressure.

The exhaust emission control device according to one embodiment of the invention is constituted as above described, in which the actuator 43 and the fuel injection device 22 are controlled in accordance with a flowchart as shown in FIG. 4, for example.

First of all, at step S1, a determination is made whether or not the exhaust gas temperature sensed by the exhaust gas temperature sensor 53 is above a predetermined temperature (e.g., 600° C.). If the exhaust gas temperature is lower than or equal to the predetermined temperature, the operation proceeds to step S5 for the steady control.

On the contrary, if the exhaust gas temperature is above the predetermined temperature, the actuator is controlled so that the amount of opening of the vane 422 is maximized at step S2, and the fuel injection timing is retarded at step S3. Thereby, the supercharging pressure of the compressor 41 is increased, so that a large amount of air having relatively low temperatures is sucked into the engine main body 20 to decrease the exhaust gas temperature. Since the fuel injection timing is retarded, the internal pressure of cylinder at the time of combustion is decreased, so that an increased internal pressure of cylinder caused by an increased amount of suction air is alleviated. Then, if the exhaust gas temperature is lower than or equal to 600° C. at step S4, the activation of the actuator 43 and the fuel injection amount is controlled by calculating the suction air amount and the fuel injection amount in accordance with the engine load using the control map at step S5.

Accordingly, the exhaust emission control device of this embodiment controls the supercharging pressure of the compressor 41 variably to increase the suction air amount into the engine main body 20 to decrease the exhaust gas temperature, if the exhaust gas temperature exceeds the predetermined temperature. Thereby, it is possible to suppress an abrupt rise in the exhaust gas temperature and prevent thermal degradation of catalytic components of alkaline metal held on the DPF 51.

This invention is not limited to the above embodiments, but may be modified or varied in various ways without departing from the scope or sprit of the invention.

Figure 5:
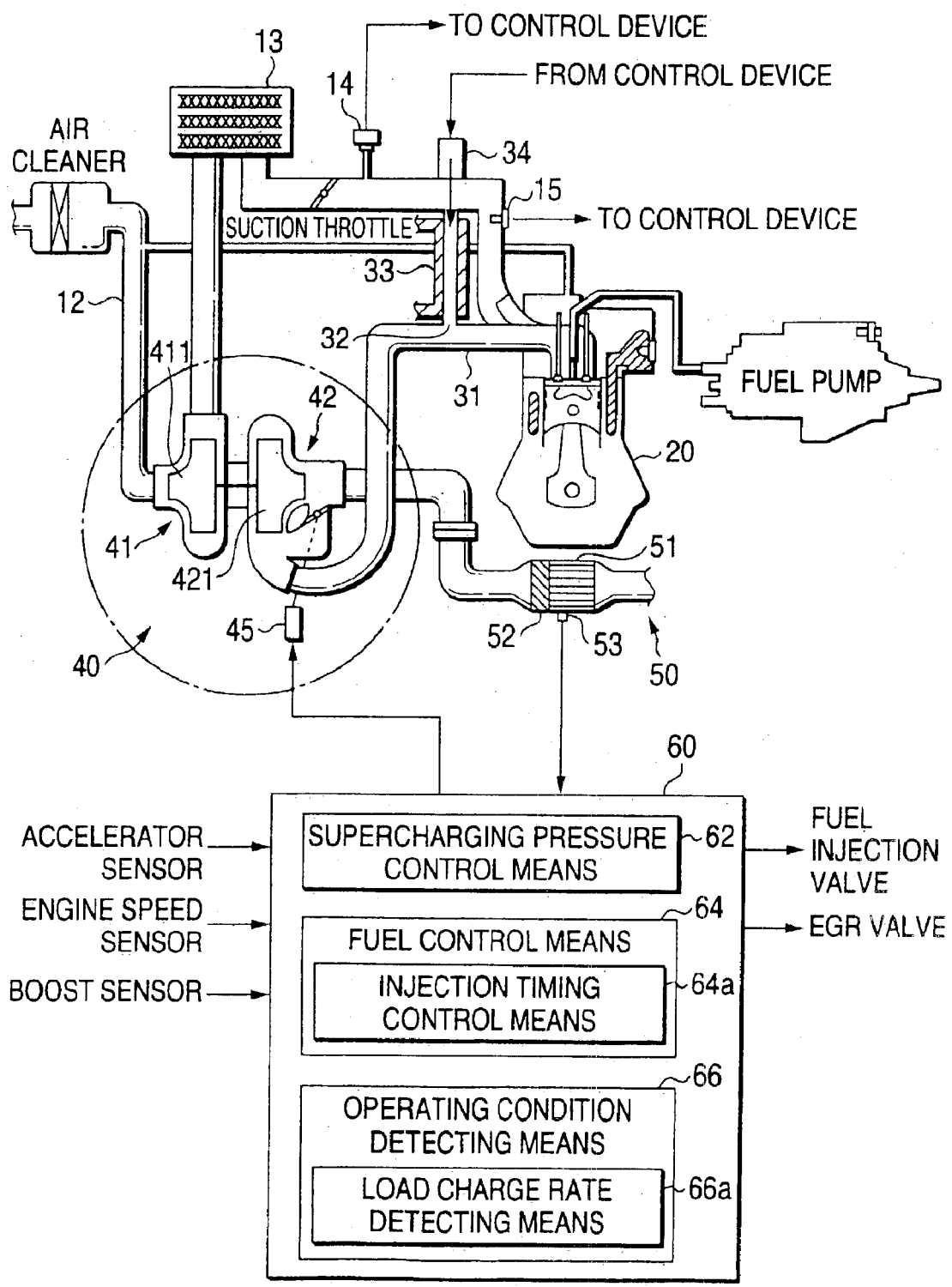
FIG. 5 is a schematic view showing the overall constitution of a diesel engine having an exhaust emission control device according to another embodiment of the present invention.

For example, as shown in FIG. 5, a bypass passage 425 may be provided for connecting the exhaust gas passage 31 on the upstream side of the turbine 42 and the exhaust gas passage 31 on the upstream side of the soot removal device 50, and a control valve (waste gate valve) 426 that can be opened or closed by the supercharging pressure control means 62 may be provided in this bypass passage. In this case, the opening or closing (duty ratio) of the control valve 426 and the opening of the control valve are controlled to adjust the amount of exhaust gas flowing into the turbine 42 to change a torque of the turbine 42. And when the exhaust gas temperature is above the predetermined temperature, the supercharging pressure control means 62 closes the control valve 426 to inhibit the flow of exhaust gas into the bypass passage, so that all the exhaust gas from the engine main body 20 flows into the turbine 42. Thereby, the rotation of the turbine 42 is accelerated to increase the supercharging pressure of the compressor 41 and decrease the exhaust gas temperature.

Accordingly, the supercharging pressure of the compressor 41 can be increased or decreased by controlling the opening or closing of the control valve 426 and regulating the flow of exhaust gas into the bypass passage 425 without controlling the opening of vane for the turbine 42, whereby the turbo charger 40 can be of a fixed capacity type, with the simpler constitution of the device.

Also, the operating condition detecting means 66 may detect a load state of the engine on the basis of the sensor information of the accelerator sensor to perform exhaust temperature control when the engine load detected by the operating condition detecting means 66 exceeds a predetermined load in a state where the exhaust gas temperature is above the predetermined temperature.

Moreover, the operating condition detecting means 66 has load change rate detecting means 66*a* for detecting the rate of change of the engine load. If the load change rate calculated by the load change rate detecting means 66*a* is a positive value in a state where the exhaust gas temperature is above the predetermined temperature, the exhaust temperature control may be performed, or if the load change rate is a negative value, the exhaust temperature control may be inhibited.

Namely, if the load change rate is negative even when the exhaust gas temperature rises temporarily to a high temperature, it is expected that the exhaust gas temperature falls naturally without making the exhaust temperature control. In this case, the exhaust temperature control is inhibited to reduce the number of retarding the fuel injection timing, thereby improving the fuel consumption.

In the above embodiment, the exhaust gas temperature detecting means 55 is constituted of the exhaust gas temperature sensor 53 disposed between oxidation catalyst 52 and the DPF 51 to sense directly the exhaust gas temperature near the filter 51 or the oxidation catalyst 52, but is not limited thereto.

For example, the exhaust gas temperature from the engine corresponding to the engine speed and the engine load may be mapped in advance, and the exhaust gas temperature near the filter 51 or oxidation catalyst 52 may be estimated using the map data. That is, the exhaust gas temperature corresponding to the current engine speed and engine load is read from the exhaust gas temperature map, and the read exhaust gas temperature is corrected using the amount of suction air or boost pressure, the suction air temperature (or outside temperature), and the vehicle transit speed to estimate the exhaust gas temperature near the filter 51 or the oxidation catalyst 52.

What is claimed is:

1. An exhaust emission control device comprising:
   operating condition detecting means for detecting an operating condition of an engine;
   fuel control means for controlling fuel supply into a combustion chamber of the engine on the basis of an output of the operating condition detecting means;
   a turbo charger having a turbine, the turbo charger supercharging a suction air in accordance with an exhaust gas of the engine;
   a filter for capturing particulates in the exhaust gas, the filter holding alkaline metal catalyst and disposed in an exhaust gas passage on the downstream side of the turbine of the turbo charger;
   exhaust gas temperature sensing means for sensing the exhaust gas temperature near the filter;
   supercharging pressure control means for controlling a supercharging pressure of the turbo charger to be increased when the exhaust gas temperature sensed by the exhaust gas temperature sensing means exceeds a predetermined temperature; and
   injection timing control means for controlling the fuel injection timing of the fuel control means to be retarded when the supercharging pressure control means controls the supercharging pressure of the turbo charger to be increased.

2. The exhaust emission control device according to claim 1, wherein the turbo charger is constituted of a variable capacity turbo, in which the supercharging pressure control means controls the variable capacity turbo to increase the supercharging pressure when the exhaust gas temperature sensed by the exhaust gas temperature sensing means exceeds the predetermined temperature.

3. The exhaust emission control device according to claim 1, wherein the turbo charger has a bypass passage for communicating the upstream side and the downstream side of the turbine, and a control valve for regulating the amount of exhaust gas to bypass the turbine via the bypass passage, in which the supercharging pressure control means decreases the amount of exhaust gas to be bypassed by the control valve when the exhaust gas temperature sensed by the exhaust gas temperature sensing means exceeds the predetermined temperature.

4. The exhaust emission control device according to claim 1, wherein the supercharging pressure control means controls the supercharging pressure of the turbo charger to be increased when the exhaust gas temperature sensed by the exhaust gas temperature sensing means exceeds the predetermined temperature and the engine sensed by the operating condition sensing means is subject to a predetermined load.

5. An exhaust emission control device comprising:
   operating condition detecting means for detecting an operating condition of an engine;
   fuel control means for controlling fuel supply into a combustion chamber of the engine on the basis of an output of the operating condition detecting means;
   a turbo charger for supercharging a suction air in accordance with an exhaust gas of the engine;
   a filter for capturing particulates in the exhaust gas, the filter holding alkaline metal catalyst and disposed in an exhaust gas passage on the downstream side of a turbine of the turbo charger;
   exhaust gas temperature sensing means for sensing the exhaust gas temperature near the filter; and
   supercharging pressure control means for controlling a supercharging pressure of the turbo charger to be increased when the exhaust gas temperature sensed by the exhaust gas temperature sensing means exceeds a predetermined temperature wherein the operating condition sensing means has load change rate detecting means for detecting the rate of change for the load of the engine, in which the supercharging pressure control means controls the supercharging pressure of the turbo charger to be increased when the exhaust gas temperature sensed by the exhaust gas temperature sensing means exceeds the predetermined temperature and the rate of change for the engine load detected by the load change rate detecting means is a positive value.

6. An exhaust emission control device comprising:
   operating condition detecting means for detecting an operating condition of an engine;
   fuel control means for controlling fuel supply into a combustion chamber of the engine on the basis of an output of the operating condition detecting means;
   a turbo charger for supercharging a suction air in accordance with an exhaust gas of the engine;
   a filter for capturing particulates in the exhaust gas, the filter holding alkaline metal catalyst and disposed in an exhaust gas passage on the downstream side of a turbine of the turbo charger;
   exhaust gas temperature sensing means for sensing the exhaust gas temperature near the filter; and
   supercharging pressure control means for controlling a supercharging pressure of the turbo charger to be increased when the exhaust gas temperature sensed by the exhaust gas temperature sensing means exceeds a predetermined temperature wherein the exhaust gas passage has oxidation catalyst disposed on the upstream side of the filter and on the downstream side of the turbine.

7. The exhaust emission control device according to claim 1, wherein the predetermined temperature is a temperature at which the alkaline metal catalyst causes depression.

* * * * *